United States Patent [19]

Seamans et al.

[11] Patent Number: 5,587,757
[45] Date of Patent: Dec. 24, 1996

[54] CAMERA ACCESS DOOR INTERLOCK MECHANISM

[75] Inventors: Tom Seamans, Corfu; Stanley W. Stephenson, III, Spencerport, both of N.Y.

[73] Assignee: Eastman Kodak Company, Rochester, N.Y.

[21] Appl. No.: 388,785

[22] Filed: Feb. 15, 1995

[51] Int. Cl.⁶ .................................................. G03B 17/02
[52] U.S. Cl. .................................................. 396/536; 396/515
[58] Field of Search ........................... 354/21, 174, 175, 354/212–215, 275, 281, 288

[56] References Cited

U.S. PATENT DOCUMENTS

| | | | |
|---|---|---|---|
| 4,149,793 | 4/1979 | Date | 354/214 |
| 4,202,614 | 5/1980 | Harvey | 354/121 |
| 5,049,913 | 9/1991 | Pagano et al. | 354/275 |
| 5,231,438 | 7/1993 | Smart | 354/281 |
| 5,307,099 | 4/1994 | Kawamura et al. | 354/21 |
| 5,481,325 | 1/1996 | Wada et al. | 354/288 X |

*Primary Examiner*—Howard B. Blankenship
*Attorney, Agent, or Firm*—Peter J. Bilinski

[57] ABSTRACT

A camera to be used with a cartridge enclosing a spool mounting a filmstrip having an access door for opening and closing the camera includes an interlock mechanism connected to the access door and engageable with the spool for preventing the access door from being opened when the spool indicates an unexposed position of the filmstrip.

7 Claims, 2 Drawing Sheets

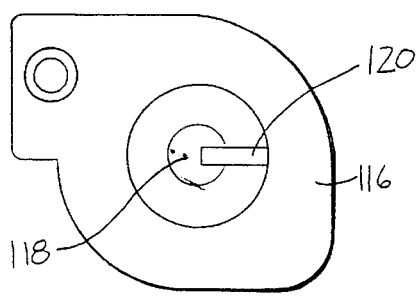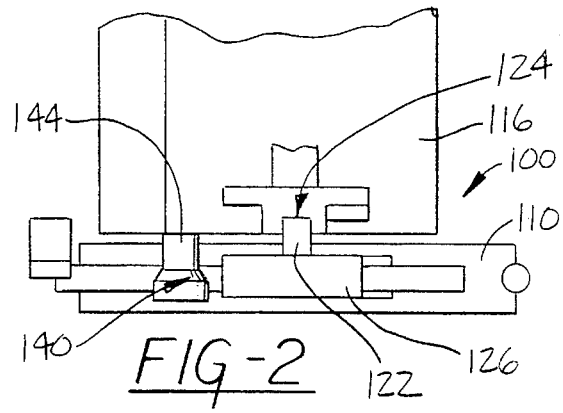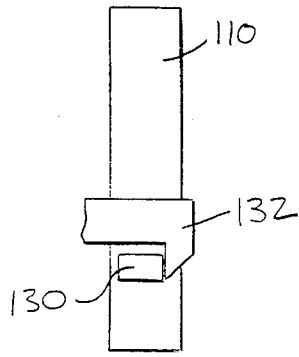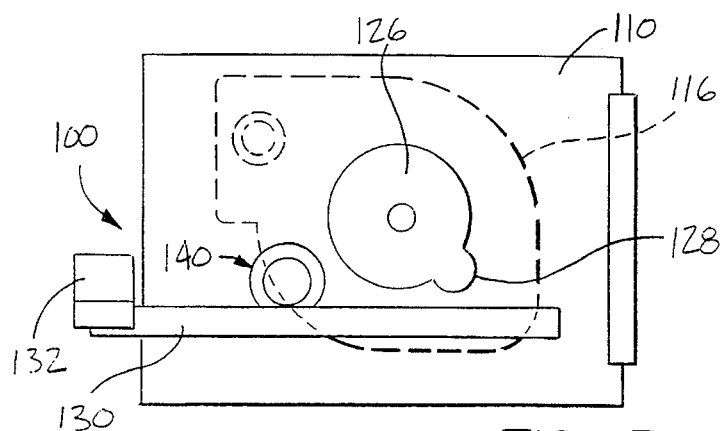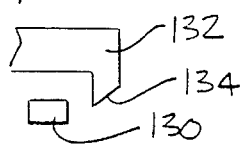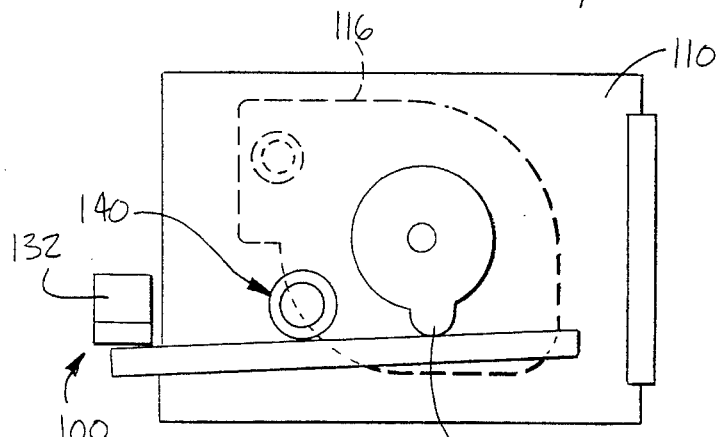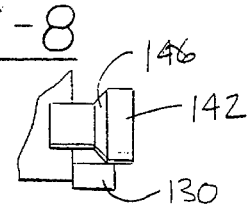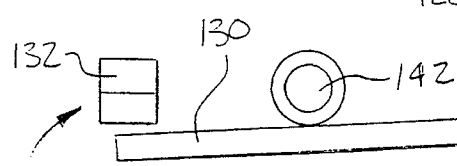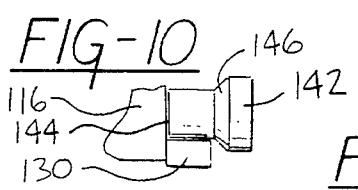

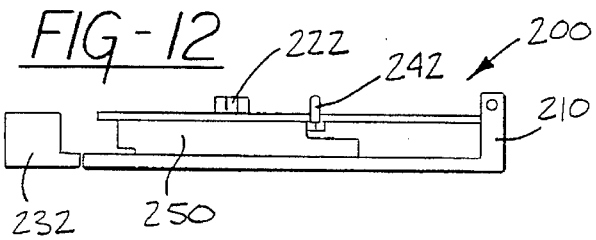
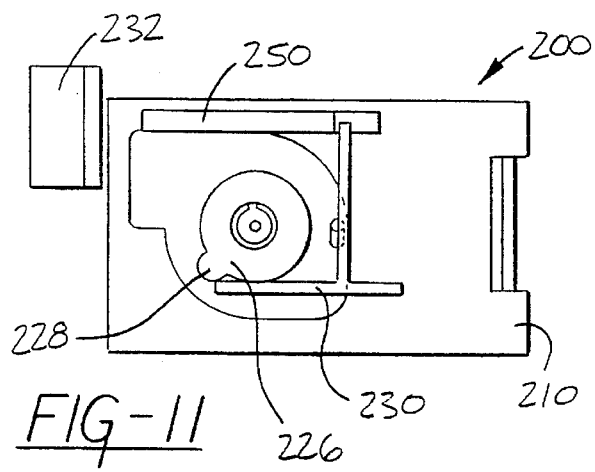
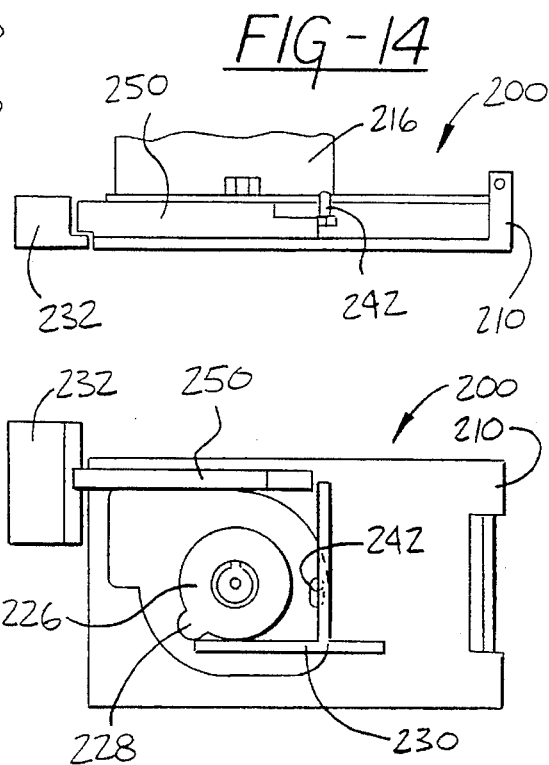
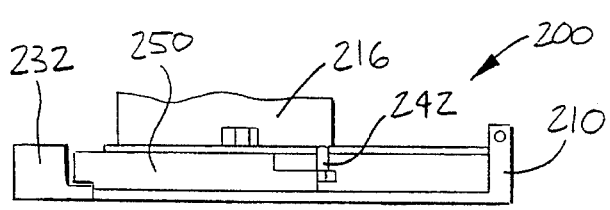
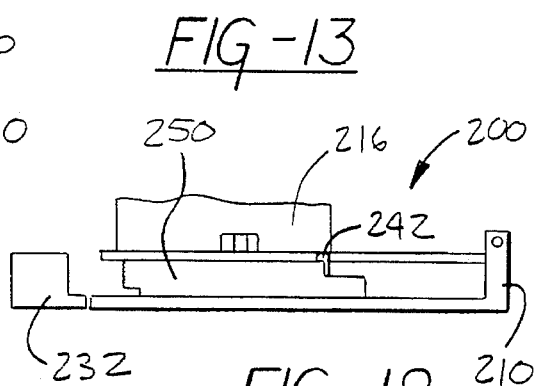
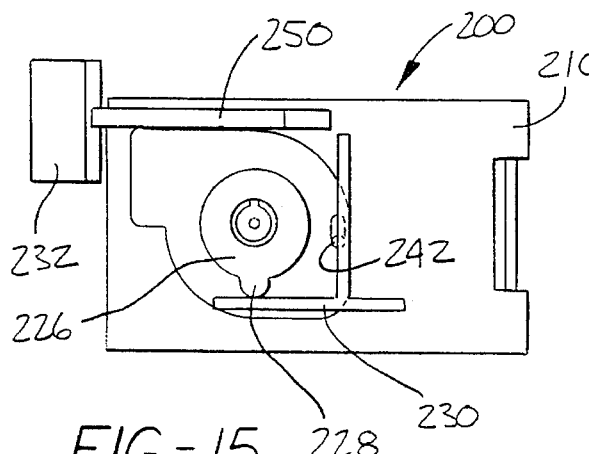
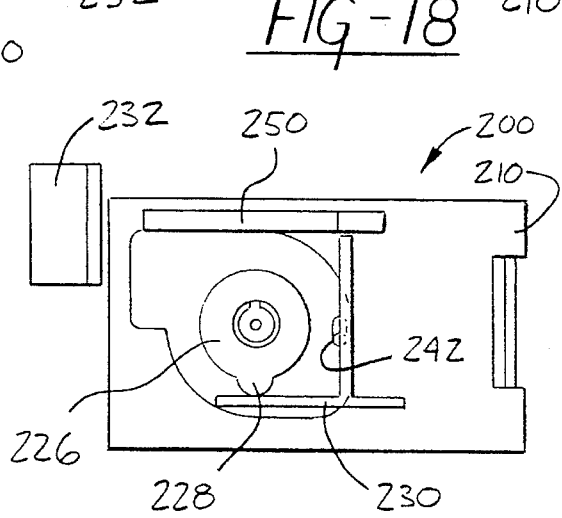

CAMERA ACCESS DOOR INTERLOCK MECHANISM

FIELD OF THE INVENTION

This invention relates to photographic cameras and more particularly to an interlock mechanism for a camera access door responsive to the spool position of a film cartridge.

BACKGROUND OF THE INVENTION

It is known that for use in a camera, a spool of filmstrip material, film, is enclosed in a light tight film cartridge. Typically, the exposed, unexposed or developed status of the filmstrip material is indicated by the angular positioning of the spool within the cartridge. An indicator on the spool in communication with the spool drive, reveals the film status.

During manufacturing, film manufacturers set the spool in the film cartridge in a first position to indicate that the filmstrip therein is unexposed. When installed in a camera, the cartridge must be sealed in a light tight manner before the film is exposed during picture taking. A camera access door is usually used to secure the cartridge in the camera and to provide a light tight seal. Mechanisms for securing the access door during the exposure sequence are well known.

After the film exposure sequence is completed, the film is completely rewound into the cartridge and the operator removes the cartridge from the camera. As part of the cartridge handling requirements, the spool must be parked at a specific position in the cartridge, different from the unexposed position set by the manufacturer, to indicate that the film in the cartridge has been exposed. In certain cameras, the operator winds the film onto the spool manually. With these cameras the operator is required to park the rewind knob at a specific position that corresponds to the exposed position. A problem with these cameras, however, is that no simple mechanism is available for securing the access door until the spool is parked properly in its cartridge.

SUMMARY OF THE INVENTION

The present invention provides an interlock mechanism connected to a camera access door and engageable with a spool of film in a film cartridge mounted in the camera to ensure that the spool is in a fixed orientation in the cartridge before the access door can be opened. Accordingly, the interlock mechanism enables access door opening only when a spool is parked in an exposed orientation in its cartridge. The present invention also provides an interlock mechanism that senses whether a cartridge is present in the camera. If no cartridge is present, the mechanism allows the access door to be opened.

The mechanism includes a spool engagement element engageable with the drive socket of the spool. The spool engagement element senses spool rotation. A cam element having a cam riser with a profile corresponding to the exposed and unexposed positions of the spool in the cartridge is in communication with the spool engagement element. A lever engageable by the cam riser is selectively moveable between a plurality of positions dependent on the rotational position of the cam. A latching assembly defined in part by the lever is operable for securing the access door and releasing the access door depending upon the rotational position of the cam element.

A cartridge sensor disposed in the access door senses the presence of a cartridge in the camera. The sensor is in communication with the lever and disables the latching assembly when a cartridge is not present in the camera.

These and other features and advantages of the invention will be more fully understood from the following detailed description of the invention taken together with the accompanying drawings.

BRIEF DESCRIPTION OF THE DRAWINGS

In the drawings:

FIG. 1 is a schematic plan view of a film cartridge;

FIG. 2 is a schematic sectional view of a camera access door including an interlock mechanism constructed in accordance with the present invention illustrated with the film cartridge of FIG. 1;

FIG. 3 is a schematic plan view of the camera access door illustrating the access door in a latched position;

FIG. 4 is a schematic view of a latching assembly for the access door of FIG. 3 illustrating a latched position;

FIG. 5 is a schematic plan view of the camera access door illustrating an enabled for opening position of the access door;

FIG. 6 is a schematic view of the latching assembly illustrating an unlatched position;

FIG. 7 is a schematic view of a cartridge sensor and the latching assembly illustrating a cartridge not sensed open position of the latching assembly;

FIG. 8 is a schematic sectional view of the cartridge sensor of FIG. 7;

FIG. 9 is a schematic view of the cartridge sensor and latching assembly illustrating a cartridge sensed closed position of the latching assembly;

FIG. 10 is a schematic sectional view of the cartridge sensor of FIG. 9;

FIG. 11 is a schematic plan view of a camera access door including an interlock mechanism constructed in accordance with an alternative embodiment of the invention;

FIG. 12 is a schematic elevational view of the access door of FIG. 11;

FIG. 13 is a schematic plan view of the access door of FIG. 11 illustrated with a film cartridge and the interlock mechanism in a locked position;

FIG. 14 is a schematic elevational view of the access door of FIG. 13;

FIG. 15 is a schematic plan view of the access door of FIG. 11 illustrating the spool in an exposed position in the cartridge and the interlock mechanism in a deactivated condition;

FIG. 16 is an schematic elevational view of the access door in FIG. 15;

FIG. 17 is a schematic plan view of the access door of FIG. 11 illustrating the mechanism positioned for opening the access door; and FIG. 18 is a schematic elevational view of the access door of FIG. 17.

DETAILED DESCRIPTION OF THE INVENTION

Referring now to the drawings in detail, FIGS. 2–10 illustrate one embodiment of the invention wherein numeral 100 generally indicates an interlock mechanism for use with an access door 110 of a camera not shown but such as is well known. As is hereinafter more fully described, interlock mechanism 100 ensures that a spool of filmstrip material in a cartridge 116 mounted in such a camera is in a fixed, parked position in the cartridge before the access door 110 can be opened.

FIG. 1 illustrates a typical film cartridge 116 wherein a spool mounts a roll of filmstrip material as is known. A spool drive socket 118 is rotated as the filmstrip material is wound out of and into the cartridge 116. An exposure indicator 120 on the drive socket 118 indicates the unexposed and exposed spool positions in the cartridge 116.

With reference to FIGS. 2–10, the access door 110 is illustrated with a cartridge 116 present. The access door 110 includes a spool engagement element 122 including a drive lug engageable with drive socket 118 for sensing spool rotation. Connected with the spool engagement element 122 is a cam element 126 having a cam riser 128 with a profile corresponding to the rotational position of the spool in the cartridge 116. When the spool is rotated, drive lug 124 is rotated and the cam element 126 is rotated together with the spool. A lever 130 mounted on the access door 110 is engageable by the cam element 126. As the spool and cam are moved together from the unexposed position to the exposed position, the profile of the cam riser 128 causes the lever 130 to be moved from a latched position, FIGS. 3 and 4, to an unlatched position, FIGS. 5 and 6. A latch 132 on the camera receives lever 130 to secure the access door 110. Latch 132 includes a ramp feature 134 for allowing the lever 130 to be guided around the latch 132 when the access door 110 is closed.

It becomes apparent that with such an arrangement, once the access door 110 is closed, the door cannot be opened until the cam element 126 has been positioned in the exposed position of the spool whereby the cam riser 128 causes the lever 130 to disconnect from the latch 132. Absent additional mechanism, the access door 110 closed without a cartridge present cannot be opened. Therefore it is preferable to rewind the filmstrip material into the spool through the cam element 126 drive lug 124 connection so that the cam element can be rotated to the open position if a cartridge 116 is not present.

Alternatively as illustrated in FIGS. 2–10, a cartridge sensor 140 is mounted in the access door 110 for sensing the presence of a cartridge 116 in the camera. The cartridge sensor includes a spring biased pin 142 in communication with lever 130 for moving lever 130 out of engagement with latch 132 if a cartridge 116 is not in the camera. Spring biased pin 142 is normally biased outwardly into the cartridge holding area and includes a cartridge engagement end 144 for engagement with a cartridge 116. A taper 146 on pin 142 urges lever 130 into an open position if a cartridge 116 is not present in the camera, FIGS. 7 and 8. The presence of a cartridge 116, FIG. 2, pushes pin 142 into the access door 110 causing the taper 146 to detach from the lever 130 and allow the lever to be received by latch 132, thereby securing access door 110. With lever 130 so secured, positioning of the cam element 126 through positioning of the spool in the exposed, parked, position is required to open the access door 110.

FIGS. 11 through 18 illustrate another embodiment 200 of the invention wherein a door lock 250 is disposed to secure the access door 210 against opening in a first position and allow the access door to be opened in a second position. The lever 230 in this embodiment is referred to as a safety interlock bar and blocks movement of the door lock 250 into the second position when the cam element 226 indicates a non-exposed position of a spool of film in a film cartridge 216 as hereinafter more fully described.

FIGS. 11 and 12 illustrate an access door 210 and latch 232. Access door 210 includes a cam element 226 having a riser 128 corresponding to the position of a spool in a film cartridge. Cam element 226 is in communication with a spool engagement element 222 and also with the safety interlock bar 230.

As illustrated in FIGS. 11 and 12, there is no cartridge present in the camera. The safety interlock bar 230 is in a no cartridge present position allowing the door lock 250 to be moved between the first and second positions. A spring biased pin 242 on the safety interlock bar 230 extends through an opening in the access door 210 and into the cartridge holding cavity.

The presence of a film cartridge 216 depresses the sensing pin 242 and urges the safety interlock bar toward a locking position relative to the door lock 250 as illustrated in FIGS. 13 and 14. When the access door 210 is closed with a cartridge 216 present, the cam element 226 positioning allows the door lock 250 to be positioned in the second position. When the door lock 250 is moved into the second locked position; the safety interlock bar 230 moves into a locking position that prevents the door lock 250 from being moved into the first open position, unless the cam element 226 is in an exposed position as indicated by the spool positioning.

With continued reference to FIGS. 13 and 14, the access door 210 has been closed, and the cam element 226 has been turned by spool activation to a door locked position. The cam element 226 is rotated as the spool is rotated and allows the access door 210 to be opened only in a film exposed position of the spool in the cartridge 216. Other known means can be provided to prevent the access door 210 from being opened when film is out of the cartridge 216.

FIGS. 15 and 16 illustrate the condition of the access door 210 when the spool indicates a film exposed position in cartridge 216. When this condition occurs, the cam riser 228 on cam element 226 urges the safety interlock bar 230 out of the pathway of movement of the door lock 250 so that the door lock can be positioned in its first position to allow the access door 210 to be opened. FIGS. 17 and 18 illustrate the door lock 250 moved to its first open position, out of engagement with latch 232, whereby the access door 210 can be opened.

Although the invention has been described by reference to specific embodiments, it should be understood that numerous changes may be made within the spirit and scope of the inventive concepts described. Accordingly, it is intended that the invention not be limited to the described embodiment, but that it have the full scope defined by the language of the following claims.

| Parts List | | | |
|---|---|---|---|
| 100. | interlock mechanism | 142 | spring biased pin |
| 110. | access door | 144. | cartridge engagement end |
| 116. | cartridge | | |
| 118. | drive socket | 146. | taper |
| 120. | exposure indicator | 200. | interlock mechanism |
| 122. | spool engagement element | 210. | access door |
| | | 216. | film cartridge |
| 126. | cam element | 222. | engagement element |
| 128. | cam riser | 226. | cam element |
| 130. | lever | 228. | cam riser |

-continued

Parts List

| | | | |
|---|---|---|---|
| 132. | latch | 230. | safety interlock bar |
| 134. | ramp | 232. | latch |
| 140. | sensor | 242. | pin |
| | | 250. | door lock |

What is claimed is:

1. A camera comprising a body having a chamber sized for containing a film cartridge, said film cartridge having a rotatable film spool for retaining a filmstrip and indicator means for indicating the exposure status of the retained filmstrip based on the rotational position of said film spool, and an access door for opening and closing said chamber, is characterized by:

an interlock mechanism connected to said access door and engageable with said spool of a loaded film cartridge for preventing said access door from opening until said spool is in a fixed rotational position to indicate the filmstrip is exposed wherein said interlock mechanism includes:

a spool engagement element engageable with the drive socket of said spool for sensing spool rotation;

a cam element cooperable with said spool engagement element, said cam element having a cam with a riser corresponding to the exposed position of said spool in said cartridge;

a lever engageable by said cam riser; said lever being selectively movable between a plurality of positions dependent on the rotational position of said cam element; and a latching assembly defined in part by said lever for selectively securing said access door and releasing said access door in response to the rotational position of said cam element.

2. The camera of claim 1 wherein said spool engaement element and cam element form an integral structure.

3. The camera of claim 1 including a cartridge sensor for sensing the presence of a cartridge in said camera, said sensor being operatively connected with said lever for disabling said latching assembly when a cartridge is not present in said camera.

4. The camera of claim 3 characterized in that said cartridge sensor includes:

a spring biased pin including a cartridge engagement end mounted in said access door, said pin being biased to project outwardly of said door, said pin including a taper to urge said lever out of engagement with said latching assembly when a cartridge is not present in said camera.

5. The camera of claim 1, further characterized by:

a door lock moveable between a first open position, and a second locked position; said door lock defining in part said latching assembly; said lever being defined by a safety interlock bar and movable into the pathway of travel of said door lock, whereby said interlock bar blocks the movement of said door lock into said first position when said spool indicates an unexposed status of said filmstrip.

6. The camera of claim 5 characterized by a cartridge sensing pin disposed in said access door and spring biased outwardly for sensing the presence of a film cartridge in said camera.

7. The camera of claim 6 characterized in that said cartridge sensing pin is in moveable engagement with said safety interlock bar and the depressing of said sensing pin through engagement with a film cartridge urges the safety interlock bar toward a locking position relative to the door lock.

* * * * *